Aug. 29, 1967  R. R. RUDOLPH ET AL  3,338,574
WORKPIECE CARRIER ASSEMBLY FOR DECORATING APPARATUS
Filed Nov. 27, 1964  3 Sheets-Sheet 3

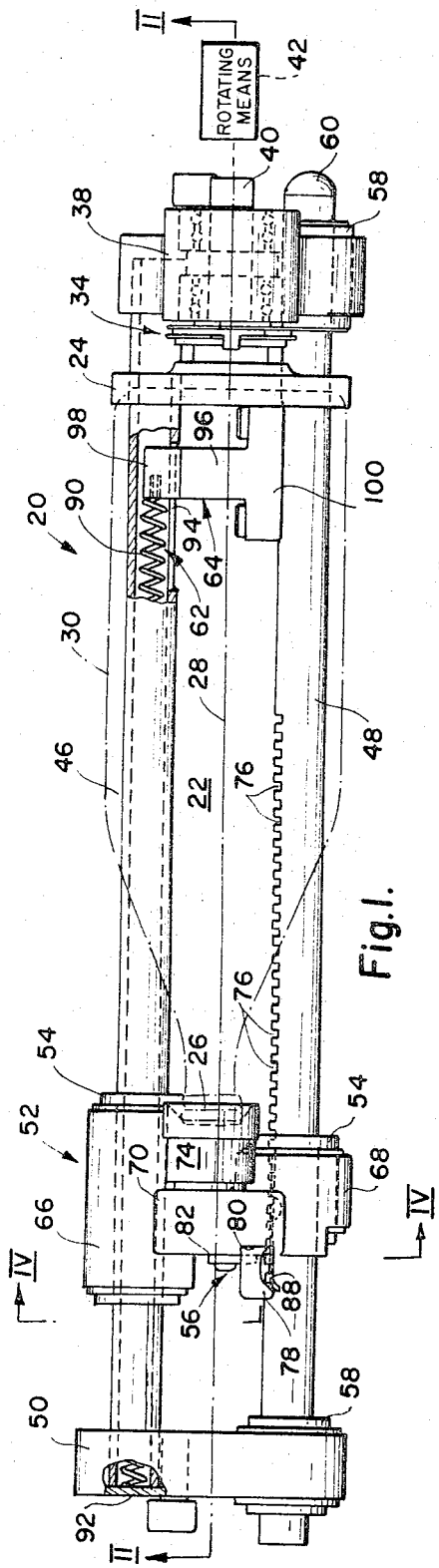
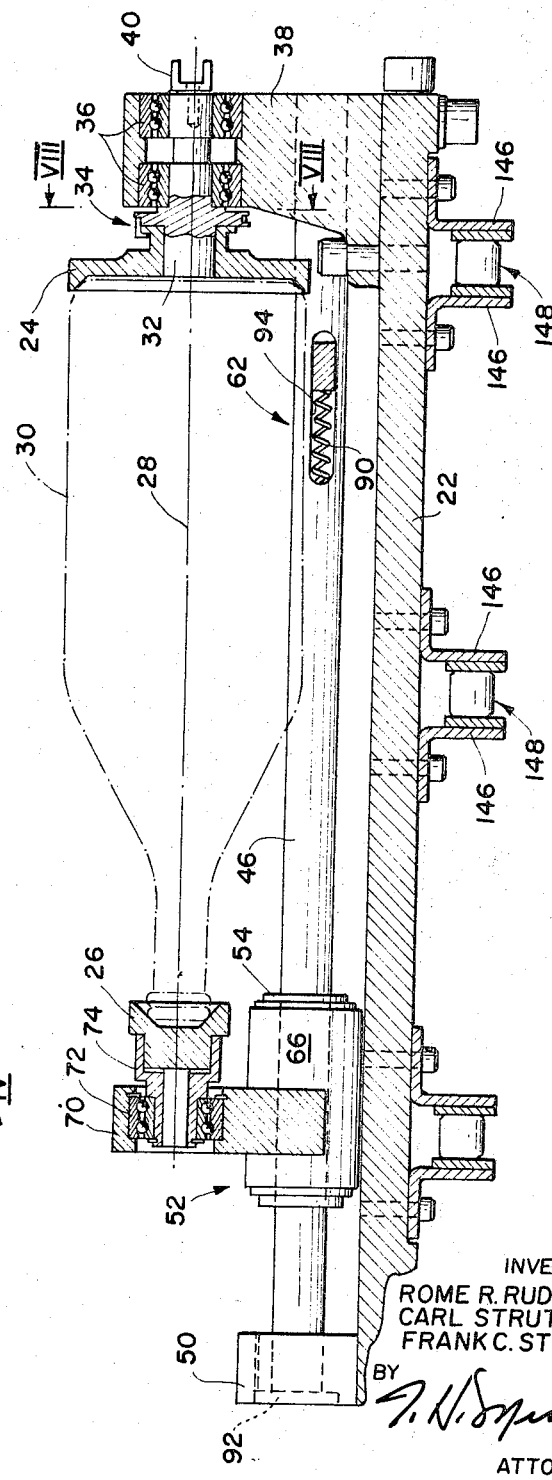

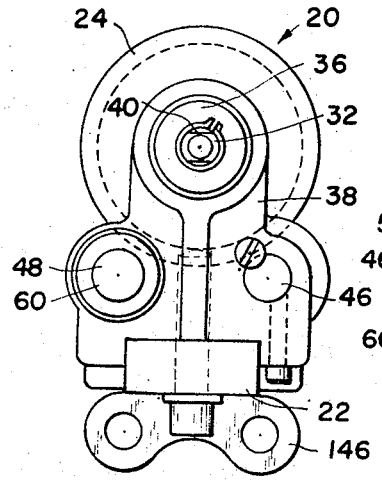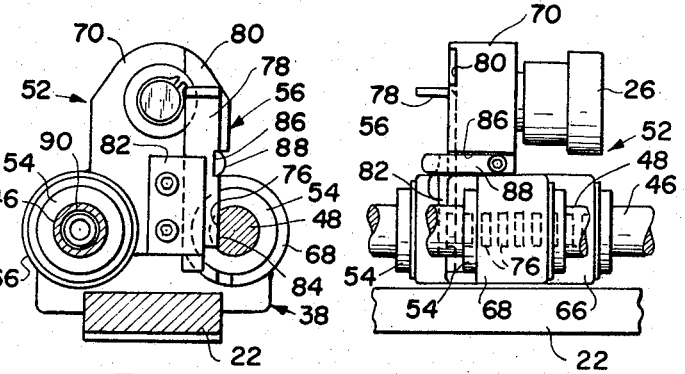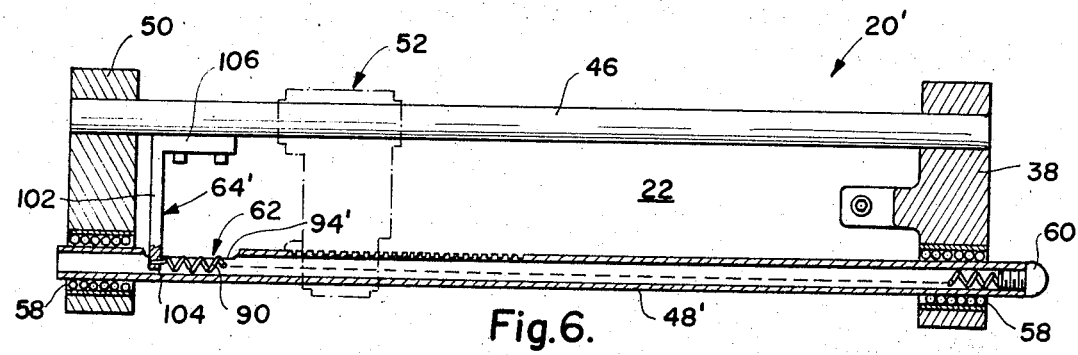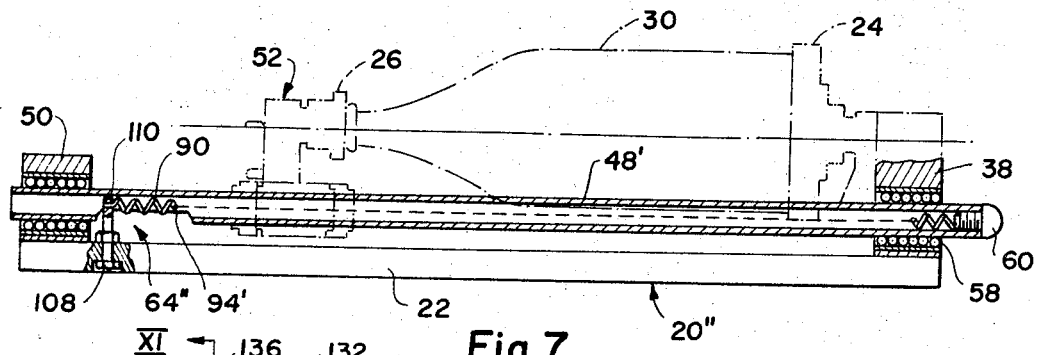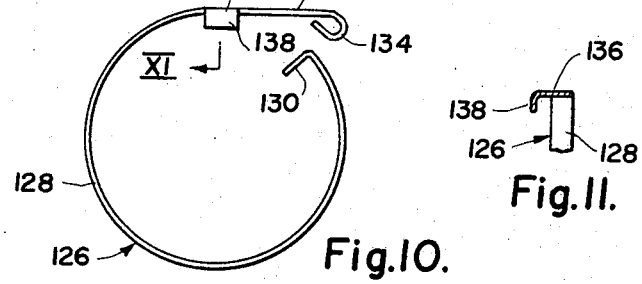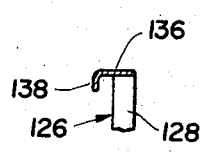

INVENTORS.
ROME R. RUDOLPH
CARL STRUTZ, JR.
FRANK C. STRUTZ
BY
ATTORNEY

3,338,574
WORKPIECE CARRIER ASSEMBLY FOR DECORATING APPARATUS

Rome R. Rudolph, Gibsonia, and Carl Strutz, Jr., and Frank C. Strutz, Mars, Pa., assignors to Carl Strutz & Co., Inc., Valencia, Pa., a corporation of Pennsylvania
Filed Nov. 27, 1964, Ser. No. 414,079
18 Claims. (Cl. 269—86)

This invention relates to decorating apparatus, and more particularly to a novel and improved workpiece carrier assembly for transporting workpieces through decorating apparatus while supporting the same in alignment with the decorating means of said apparatus.

The primary object of the present invention is to provide a novel and improved carrier assembly for supporting workpieces during the application of decorative imprints to their outer surfaces.

Other important objects of the invention include:

To provide an improved workpiece carrier assembly having novel cam operated means for supporting one of the clamping chucks for movement toward and away from the other clamping chuck, the arrangement being such that initially the clamping chucks are spread apart during the reception of a workpiece, are released to clamp a workpiece and support the same for movement through the decorating apparatus, and then spread apart during discharge of the decorated workpiece;

To provide an improved workpiece carrier assembly having a relatively simplified construction and which assures positioning of the workpiece in alignment with the decorating means of the decorating apparatus;

To provide an improved workpiece carrier assembly having a pair of opposed clamping chucks each of which may be quickly and easily detached for replacement purposes; and To provide an improved workpiece carrier assembly wherein one of the chucks is supported for movement toward and away from the other chuck and which may be quickly and easily repositioned with respect to the other chuck for the purpose of adjusting the spacing between the chucks.

In accordance with the present invention, there is provided a workpiece carrier assembly for supporting a workpiece during the application of one or more decorative imprints to the outer surface of the workpiece. As is conventional, the present workpiece carrier assembly comprises a base and a pair of rotatably mounted clamping chucks adapted to engage the opposite ends of a workpiece for supporting the same. One of the clamping chucks is mounted on the base for rotation about its central axis. The central axis of the first clamping chuck coincides with the central axis of the workpiece to be carried.

In accordance with the present invention, however, the second clamping chuck is rotatably supported on a support block which, in turn, is carried on at least one and preferably two spaced parallel rods. The central axis of the second clamping chuck is coincident with the central axis of the first clamping chuck.

The rods are supported on the base in spaced parallel relation with the central axis of the clamping chucks. Means is provided for slideably supporting one of the rods on the base for reciprocal movement along its longitudinal axis and hence, parallel with the central axes of the clamping chucks. The support block is slideably connected to both of the rods and is secured to the movable one of the rods for movement therewith. Hence, the second clamping chuck is movable reciprocably toward and away from the first clamping chuck. Resilient means is provided for urging the movable rod toward the first clamping chuck, whereby the second clamping chuck is normally urged toward the first clamping chuck for the purpose of clamping a workpiece therebetween and thereby supporting the workpiece for rotation about its central axis.

Releasable means is provided for releasably securing the support block to the movable one of the rods, the arrangement being such that the second clamping chuck may be quickly and easily moved to a new position on the rods to adjust the spacing between the clamping chucks so as to receive a workpiece of a different length. The adjustment of the spacing between the clamping chucks is accomplished independently of the resilient means which urges the movable rod toward the first clamping chuck.

The present carrier assembly also is provided with a novel means permitting each of the clamping chucks to be quickly and easily detached from or attached to its supporting member. Hence, replacement of each of the clamping chucks with a different clamping chuck may be easily accomplished.

The above and other objects and advantages of the present invention will become apparent from the following detailed description by reference to the accompanying drawings, in which:

FIGURE 1 is a plan view illustrating one embodiment of the present workpiece carrier assembly;

FIG. 2 is a cross-sectional view, taken along the line II—II of FIG. 1;

FIG. 3 is an end view as viewed from the line III—III of FIG. 2;

FIG. 4 is a cross-sectional view, taken along the line IV—IV of FIG. 1, illustrating a positionable clamping chuck of the present carrier assembly;

FIG. 5 is a side view of the positionable clamping chuck of FIG. 4;

FIG. 6 is a plan view similar to FIG. 1, illustrating an alternative arrangement of the present carrier assembly;

FIG. 7 is a side view, partly in cross section, illustrating a further alternative arrangement of the present carrier assembly;

FIG. 10 is a front view of a spring member employed in the attachment means of FIG. 8;

FIG. 11 is a cross-sectional view, taken along the line XI—XI of FIG. 10;

*Workpiece carrier assembly—general description*

Figure 8:
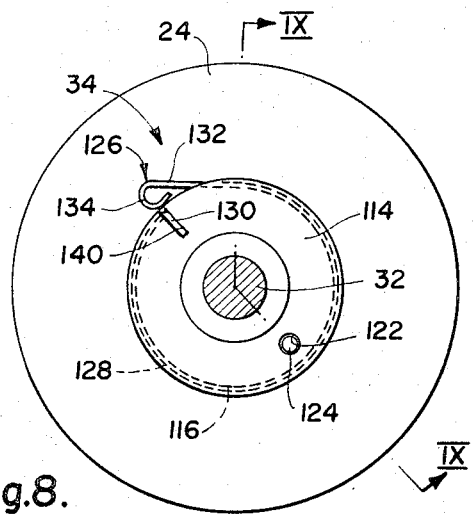
FIG. 8 is a cross-sectional view, taken along the line VIII—VIII of FIG. 2, illustrating attachment means for quickly detaching or attaching a clamping chuck to a supporting shaft.

Referring now to FIGS. 1–3, a workpiece carrier assembly 20 is illustrated and as is conventional, comprises a base 22 supporting a pair of clamping chucks 24, 26 for rotation about a common central axis indicated by the dash-dot line 28. The clamping chucks 24, 26 are adapted to engage the opposite ends of a workpiece such as the glass bottle 30 shown in phantom outline in FIGS. 1 and 2, and support the same for rotation about its central axis which is coincident with the central axis 28.

The clamping chuck 24 is mounted on a drive shaft 32 and secured thereto by attachment means 34 to be described later in the specification. The drive shaft 32 is rotatably supported in journals 36 housed within a mounting block 38 which, in turn, is secured to the base 22. As schematically illustrated in FIG. 1, the projecting end 40 of the drive shaft 32 is adapted to be driven by rotating means schematically illustrated at 42. The rotating means 42 may comprise any suitable mechanism which will rotate the bottle during registration and decoration thereof. For example, the rotating means 42 may comprise that bottle rotating means described and illustrated in copending application Ser. No. 382,004, now Patent No. 3,253,538, filed July 13, 1964, and assigned to the assignee of the present invention.

In accordance with the present invention, the workpiece carrier assembly 20 further comprises a pair of rods 46, 48 supported at one of their ends by the mounting block 38 and at the other of their ends by means of a second mounting block 50. The rods 46, 48 are disposed in spaced, parallel relation with each other. Also, the rods 46, 48 are disposed below and in parallel relation with the central axis 28 of the clamping chucks 24, 26. A support block 52 extends between the rods 46, 48 and is slideably supported thereon by means of journals 54 commonly known as ball bushings. The journals 54 permit the support block 52 to slide freely along the rods 46, 48.

In this embodiment, the support block 52 is secured to the rod 48 by releasable means 56 which will be described in greater detail later in the specification. The releasable means 56 permits the support block 52 to be moved axially along the rods 46, 48 toward and away from the clamping chuck 24 and secured at a desired location thereon, the arrangement being such that the spacing between the clamping chucks 24, 26 may be readily adjusted to correspond substantially with the length of the workpiece to be supported.

Also in this embodiment, the rod 48 is supported in journals 58 of the ball-bushing type, mounted in the mounting blocks 38, 50. The rod 48 is thereby supported for reciprocal movement along its longitudinal axis and, hence, parallel with the central axis 28. The rod 48 has an end portion 60 projecting beyond the mounting block 38. The end portion 60 serves as a cam follower and is adapted to engage a cam track or suitable cam means for displacing the rod 48 to the left of FIG. 1 whereby the clamping chuck 26 is moved away from the clamping chuck 24. The end portion 60 preferably is removable so that it may be replaced when worn.

In order to return the rod 48 and hence the clamping chuck 26 into the clamping position shown in FIGS. 1 and 2, the workpiece carrier assembly 20 is provided with resilient means 62 carried within the rod 46 and engaged with abutment means 64 secured to the rod 48 and projecting therefrom into engagement with the resilient means 62. The overall arrangement is such that when the end portion 60 of the rod 48 engages a suitable cam means, the rod 48 will be displaced to the left of FIG. 1 so as to move the clamping chuck 26 away from the clamping chuck 24. At this time, the workpiece 30 illustrated in FIGS. 1 and 2 may, for example, be discharged from the workpiece carrier assembly 20 or be in the process of being positioned between the clamping chucks 24, 26. When the rod 48 is released, the resilient means 62 will urge the rod 48 and hence the clamping chuck 26 toward the clamping chuck 24 so that, for example, the workpiece 30 will be clamped in the position shown in FIGS. 1 and 2.

*Support block 52*

Referring now to FIGS. 1, 2, 4 and 5, the support block 52 comprises tubular segments 66, 68 within each of which is housed one of the journals 54. A central upstanding housing 70 extends between and connects the tubular segments 66, 68. Within the upper end of the housing 70 there resides a bearing 72 which rotatably supports a chuck receiving member 74. In this instance, the clamping chuck 26 is slideably received within the receiving member 74 and is supported thereby for rotation about the central axis 28. Replacement of the clamping chuck 26 is readily accomplished by sliding the present clamping chuck 26 out of the chuck receiving member 74 and replacing it, for example, with a clamping chuck of a different diameter.

*Releasable means 56*

Referring now to FIGS. 1, 4 and 5, the releasable means 56 serves to secure the support block 52 to the rod 48 for movement therewith. As can best be seen in FIG. 1, a plurality of uniformly spaced, vertically extending slots 76 are formed on the rod 48. A locking member 78 is received within a vertically extending groove 80 cut in the outboard face of the housing 70 and is slideable vertically therein. A retainer plate 82 is secured to the outboard face of the housing 70 and overlies one face of the locking member 78 so as to retain it within the groove 80. The locking member 78 has an edge 84 which is received within one of the slots 76 to secure the support block 52 to the rod 48. Hence, the support block 52 is prevented from moving axially of the rods 46, 48. The locking member 78 is provided with a notch 86 cut in the edge 84. The notch 86 is adapted to receive a spring tab 88 which when engaged in the notch 86 prevents the locking member 78 from sliding vertically in the groove 80 and thereby becoming disengaged from the slot 76. The spring tab 88 is secured to the housing 70 as can best be seen in FIG. 5 and projects outwardly therefrom.

To reposition the support block 52 along the rods 46, 48, the spring tab 88 is bent away from the notch 86 to free the locking member 78 for movement upwardly out of engagement with the slot 76. The support block 52 then may be moved to a new position along the rods 46, 48. Thereafter, the locking member 78 is moved downwardly into engagement with a different one of the slots 76. Notice that the spring tab 88 automatically engages the notch 86 to again retain the locking member 78 in position.

*Resilient means 62*

As stated above, the support block 52 is journaled by means of the ball bushings 54 for movement axially along the rods 46, 48 toward and away from the clamping chuck 24. The releasable means 56 secures the support block 52 to the rod 48 at a desired location along the rods 46, 48. The rod 48 is supported for reciprocal movement along its longitudinal axis by means of the journal means 58. Hence, the rod 48, the support block 52 and the clamping chuck 26 are movable as a unit reciprocally toward and away from the clamping chuck 24.

In the present carrier assembly 20, the clamping chuck 26 normally is disposed in a clamping relation with the clamping chuck 24. The resilient means 62 urges the rod 48 and hence the clamping chuck 26 toward the clamping chuck 24. In the arrangement of the carrier assembly 20 illustrated in FIGS. 1-5, the resilient means 62 comprises an elongated spring member 90. The rod 46, in this instance, is tubular and carries the spring member 90 therewithin. The spring member 90 has one of its ends engaged with a capping plate 92 serving to seal off that end of the rod 46 residing within the mounting block 50. The tubular rod 46 is provided with a slot 94 which exposes an end portion of the spring member 90. The abutment means 64 comprises a T-shaped member 96 having a central arm 98 extending through the slot 94 into engagement with the spring member 90 and a transverse arm 100 which is secured to the rod 48. Hence, when the end portion 60 (see FIG. 1) of the rod 48 engages a suitable cam means, the rod 48 will be displaced to the left of FIG. 1 whereupon the spring member 90 is compressed between the capping plate 92 and the central arm 98. When the rod 48 is released, the compressed spring member 90 will urge the rod 48, the support block 52 and the clamping chuck 26 toward the clamping chuck 24. It should be evident, then, that the present workpiece carrier assembly 20 when installed on a decorating machine, requires a relatively short cam for displacing the rod 48.

Another important feature of the present workpiece carrier assembly 20 is that the spring member 90 has a relatively long useful life. The extended working life of the present spring member 90 is accomplished by making the compressed length of the spring 90 substantially equal to the uncompressed length of the spring 90. For example, in one embodiment of the present workpiece carrier assembly 20, the spring 90 had an uncompressed length of fourteen and three-quarter inches. The spring member was compressed one and one-quarter inches making the compressed length of the spring member 90 thirteen and one-half inches long or about 92% of the uncompressed length. Hence, the relatively short length by which the spring member 90 is compressed results in the spring member 90 being subjected to a relatively small amount of torsion which is distributed throughout its relatively long length. It should be evident then by virtue of the relatively short length of compression, that the spring member 90 will have a relatively long working life.

*Resilient means 62—alternative arrangements*

Alternative arrangements of the resilient means 62 are illustrated in FIGS. 6 and 7. Corresponding numerals will be employed to identify corresponding parts already described.

In FIG. 6, there is illustrated a workpiece carrier assembly 20' wherein the support block 52 is supported on the rods 46, 48'. In this embodiment, the rod 48' is tubular and contains the spring member 90. The spring member 90 has one end engaged with the end portion 60 of the rod 48' and its opposite end engaged with an abutment means 64' comprising an L-shaped member 102 having a first arm 104 extending through a slot 94' provided in the rod 48' and into engagement with the spring member 90 and a second arm 106 secured to the rod 46. In this embodiment, the spring member 90 is compressed between the end portion 60 of the rod 48' and the arm 104 of the abutment means 64'. The operation of the workpiece carrier assembly 20' is identical with the operation of the workpiece carrier assembly 20 illustrated in FIGS. 1–5.

In FIG. 7, there is illustrated a workpiece carrier assembly 20" wherein the spring member 90 is carried within the rod 48'. In this arrangement, an abutment means 64" comprises a bolt 108 secured to the plate 22 and extending upwardly therefrom through the slot 94' provided in the rod 48'. The bolt 108 includes an end portion 110 which engages an end of the spring member 90. The operation of the workpiece carrier assembly 20" is identical to the operation of the workpiece carrier assembly 20 illustrated in FIGS. 1–5.

*Attachment means 34*

Figure 9:
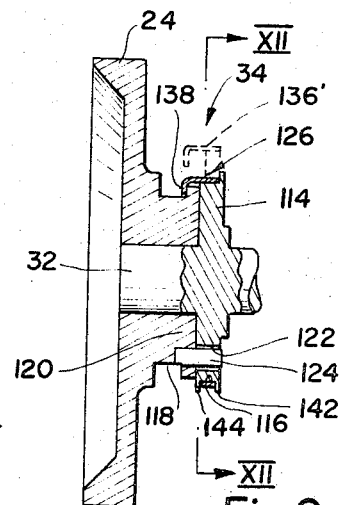
FIG. 9 is a cross-sectional view, taken along the line IX—IX of FIG. 8.

Referring now to FIGS. 8 and 9, there is shown the clamping chuck 24 mounted on the drive shaft 32. The drive shaft 32 is provided with a radial flange 114 having a shallow peripheral groove 116. The clamping chuck 24 also is provided with a peripheral groove 118 cut in a neck portion 120 projecting rearwardly thereof.

The radial flange 114 is provided with an aperture 122 which is adapted to receive a pin 124 secured to and projecting rearwardly of the neck portion 120. The pin 124 and the aperture 122 provide means for non-rotatably connecting the clamping chuck 24 to the drive shaft 32.

A spring clip 126 is employed for detachably connecting the clamping chuck 24 to the drive shaft 32. The spring clip 126 is best illustrated in FIG. 10 and comprises a generally circular main body 128 having a circumferential length of less than 360°. The circular main body 128 has a first end 130 which is radially inwardly bent and a second end 132 which projects tangentially from the circular main body 128 and terminates in a loop 134. As can best be seen in FIGS. 10 and 11, the spring clip 126 is provided with an axially extending wall portion 136 having an inwardly bent end portion 138 which is spaced from the main body 128.

The spring clip 126 is mounted on the radial flange 114 of the drive shaft with one portion thereof, that is, the circular main body 128, residing within the shallow peripheral groove 116 of the radial flange 114. The radial flange 114 is provided with a radial slot 140 adapted to receive the inwardly bent first end 130 so as to retain the spring clip 126 on the radial flange 114.

As can best be seen in FIG. 9, the clamping chuck 24 is fitted over the drive shaft 32 and the pin 124 is inserted in the aperture 122. The loop 134 of the spring clip is raised so as to raise the wall portion 136 into that position shown in dotted outline at 136' of FIG. 9. When the neck portion 120 is seated against the radial flange 114, the loop 134 is released whereby a second portion of the spring clip 126, that is the inwardly bent end portion 138 is received and resides within the radial groove 118 to retain the clamping chuck 24 on the drive shaft 32.

Figure 12:
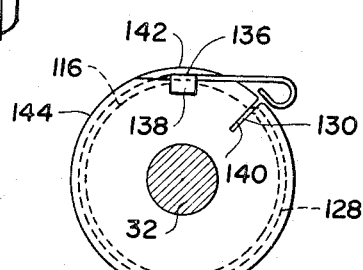
FIG. 12 is a cross-sectional view, taken along the line XII—XII of FIG. 9.

As can best be seen in FIGS. 9 and 12, the groove 116 is defined by spaced radial walls 142, 144. In the region of the wall portion 136, a portion of the radial wall 144 is cut away. The circular main body 128 is engaged with the bottom of the groove 116 around substantially its entire circumferential length and is thereby prevented from moving in a direction parallel with the longitudinal axis of the drive shaft 32. Consequently, the clamping chuck 24 also is prevented from movement parallel with the longitudinal axis of the drive shaft 32 by means of the engagement between the inwardly bent end portion 138 and the groove 118 of the neck portion 120 thereof.

It should be evident then that the clamping chuck 24 is positively secured to the drive shaft 32 for rotation therewith and being secured thereto by means of the spring clip 126, is prevented from becoming disengaged from the drive shaft 32. However, it should also be evident that the detachment of the clamping chuck 24 from the drive shaft 32 may be readily accomplished. Hence, replacement of the clamping chuck 24 also may be accomplished in a rapid and efficient manner.

Although the spring clip 126 has been shown and described for connecting the clamping chuck 24 to the drive shaft 32, it should be readily apparent that the spring clip 126 could be employed, if desired, to connect the clamping chuck 26 to the shaft for rotation therewith.

*Utility*

The present invention discloses a basic carrier assembly which is adaptable for use on different types of decorating machines. For example, the present carrier assembly may be employed in a decorating machine of the continuous motion type wherein the carriers and the workpieces are driven at a constant linear speed. In this type of decorating machine, the workpieces are rotated continuously during their travel through the apparatus and decorated at one or more stations along its path of travel or are rotated only during the application of the decorative imprints.

The present carrier assembly also may be employed on a decorating apparatus of the well-known intermittent motion type wherein the carriers and the workpieces are subjected to intermittent traveling motion, i.e., stop-start motion. In this machine, each of the carriers and the workpieces are stopped beneath the decorating means during which time the workpiece is rotated and the decorative imprint is applied.

As should be evident from the foregoing description, the present carrier assembly 20 is readily adaptable for supporting generally cylindrical workpieces such as the bottle 30. In this instance, the carrier assembly 20 is secured directly to a conveyor chain of a decorating machine for movement therewith. The surface of the bottle 30 is substantially horizontal and may be decorated. As can be seen in FIGS. 2 and 3, spaced connectors 146 are secured to the base 22 and are positioned so as to be secured to chain links 148 of endless conveyor chains.

Figure 13:
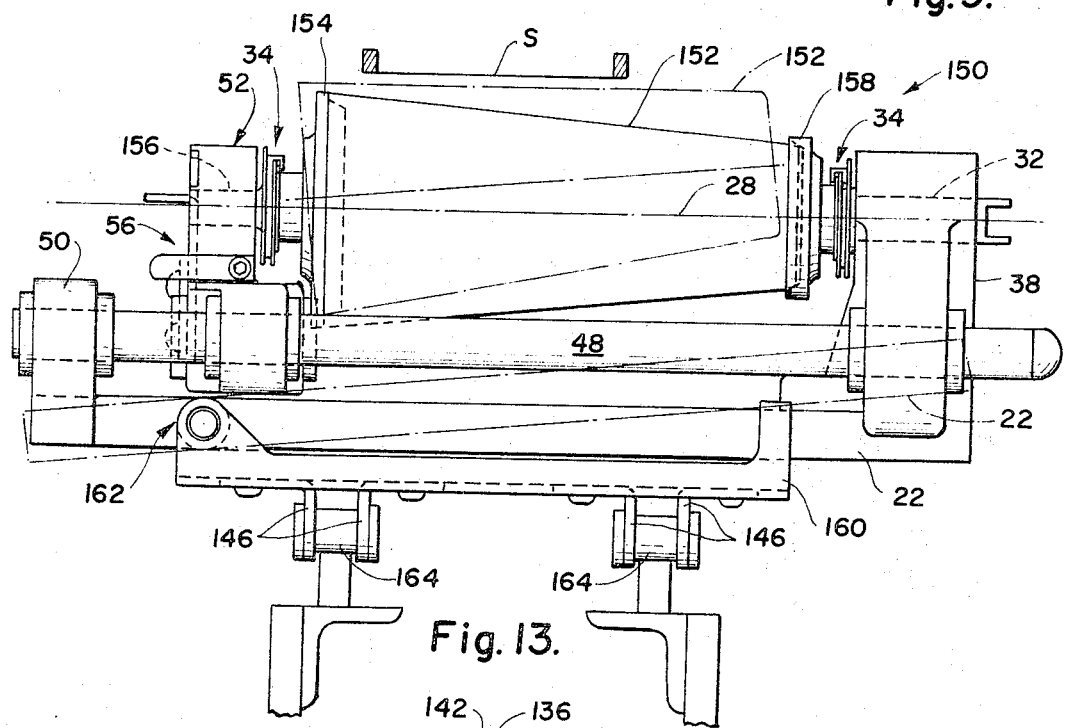
FIG. 13 is a side view illustrating a further alternative arrangement of the present carrier assembly which permits supporting frusto-conical workpieces.

Alternatively, the present carrier assembly 20 also is readily adaptable for supporting frusto-conical workpieces wherein the surface to be decorated is sloped from the horizontal. Reference is now directed to FIG. 13 wherein there is illustrated a carrier assembly 150 adapted to support frusto-conical workpieces such as a glass tumbler 152 illustrated therein. Corresponding numerals will be employed to identify corresponding parts already described.

In this arrangement, the support block 52 rotatably supports a clamping chuck 154 which is connected to a shaft 156 by means of the attachment means 34. The clamping chuck 154 is sized so as to fit into the open mouth of the glass tumbler 152. The support block 52 is slideable along the rods 46 (not visible) and 48 as described above. The releasable means 56 secures the support block 52 at the desired position along the length of the rods 46, 48. The mounting block 38 rotatably supports a clamping chuck 158 which is connected to the drive shaft 32 by means of the attachment means 34. The clamping chuck 158 is sized so as to engage the bottom of the glass tumbler 152. The clamping chucks 154, 158 are rotatable about the common central axis 28. The rod 48 is urged toward the clamping chuck 158 by the resilient means 62 (not shown). The resilient means 62 may take any one of the arrangements illustrated in FIGS. 1, 6 or 7.

In this embodiment, the base 22 overlies a second base 160 and is connected thereto by hinge means 162 for pivotal movement about an axis extending transversely of the central axis 28. The base 22 may be pivoted upwardly about the hinge means 162 by any suitable means such as a conventional cam arrangement, into the position illustrated by the dot-dot-dash outline. During this pivotal movement, the glass tumbler 152 also will be moved upwardly whereby its uppermost surface is horizontal as shown in dot-dot-dash outline. So positioned, the upper surface of the tumbler 152 now is parallel with a stencil screen schematically illustrated S. The glass tumbler 152 may be rotated and decorated in the usual manner whereupon the base 22 will be lowered into engagement with the second base 160 for further transfer through the decorating machine.

As is conventional, the second base 160 may be secured to chain links 164 of an endless conveyor chain by means of the spaced connectors 146. The operation of the carrier assembly 150, that is, the clamping and unclamping of the glass tumbler 152, is identical with the operation of the carrier assemblies 20, 20' and 20" of FIGS. 1–4, 6 and 7.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a carrier assembly for rotatably supporting workpieces for decoration, the combination comprising: a base; first and second clamping chucks, said first clamping chuck being mounted at one end of said base for rotation about a central axis of said first clamping chuck; at least one rod mounted on said base in spaced parallel relation with said central axis; means supporting said rod for reciprocal movement parallel with said central axis; resilient means for urging said rod axially toward said first clamping chuck; and means for supporting said second clamping chuck on said rod for movement therewith and in axial alignment with said central axis.

2. The combination of claim 1 wherein said means for supporting said second clamping chuck comprises a support block slideably connected to said rod and including releasable means for securing said support block to said rod whereby the spacing between said first and second clamping chucks may be adjusted.

3. The combination of claim 2 wherein said releasable means comprises a plurality of spaced slots formed on said rod and a member mounted on said support block for movement into and out of engagement with said slots.

4. The combination of claim 1 wherein an end portion of said rod projects beyond the outboard end of said base, said end portion being adapted to cooperate with cam means for reciprocating said rod along its longitudinal axis.

5. The combination of claim 1 wherein said base comprises a plate member adapted to be secured to conveyor means of a decorating machine.

6. The combination of claim 1 including a second base underlying the first-mentioned base; and hinge means connecting the first-mentioned base to said second base for pivotal movement about an axis extending perpendicular to said central axis.

7. The combination of claim 6 wherein said hinge means is positioned adjacent to that end of the first-mentioned base which is remote from said first clamping chuck.

8. In a carrier assembly for rotatably supporting workpieces for decoration, the combination comprising: a base; first and second clamping chucks, said first clamping chuck being mounted on said base for rotation about its central axis; at least one tubular rod supported on said base in spaced parallel relation with said central axis; means supporting said tubular rod for reciprocal movement parallel with said central axis; a spring member carried within said tubular rod for urging said tubular rod axially toward said first clamping chuck; means connecting one end of said spring member to said tubular rod; a stationary abutment engaged with the opposite end of said spring member; and means supporting said second clamping chuck on said tubular rod for movement therewith and in axial alignment with said central axis.

9. In a carrier assembly for rotatably supporting workpieces for decoration, the combination comprising: a base; first and second clamping chucks, said first clamping chuck being mounted on said base for rotation about its central axis; a pair of spaced parallel rods mounted on said base, spaced from and parallel with said central axis; means supporting at least one of said rods for reciprocal movement along its longitudinal axis; resilient means for urging said one of said rods axially toward said first clamping chuck; and a support block extending between said pair of rods, said support block being secured to said one of said rods for movement therewith, said second clamping chuck being mounted on said support block and carried thereby in axial alignment with said central axis.

10. In a carrier assembly for rotatably supporting workpieces for decoration, the combination comprising: a base; first and second clamping chucks, said first clamping chuck being mounted on said base for rotation about its central axis; a pair of spaced parallel rods mounted on said base in spaced parallel relation with said central axis, one of said rods being a tubular rod and having a closed end; means supporting a first of said rods for reciprocal movement along its longitudinal axis; an elongated spring member residing within said tubular rod and engaged with said closed end; slot means formed in said tubular rod for exposing a portion of said spring; a stationary abutment extending through said slot means and engaged with said spring member; and a support block extending between said spaced rods, said support block being secured to said first of said rods for movement therewith and being slideably connected to the other of said rods; said second clamping chuck being carried by said support block in axial alignment with said central axis.

11. The combination of claim 10 wherein said stationary abutment comprises an arm having one end extending through said slot means and its opposite end secured to the other of said rods.

12. The combination of claim 11 wherein said first of said rods comprises said tubular rod and contains said spring member; said arm having one of its ends extending through said slot means and its opposite end secured to the second of said rods.

13. The combination of claim 10 wherein said first of said rods comprises said tubular rod and contains said spring member; said stationary abutment comprising an arm secured to said base and extending upwardly therefrom through said slot means into engagement with said spring member.

14. The combination of claim 11 wherein the second of said rods comprises said tubular rod and contains said spring member; said arm having one end secured to said first of said rods and its opposite end extending through said slot means into engagement with said spring member.

15. The combination of claim 9 wherein said support block is releasably secured to said first of said rods whereby the spacing between the first and second clamping chucks may be adjusted.

16. In combination with a support block slideably supported on a carrier member for reciprocal movement longitudinally of said carrier member, releasable lock means comprising a plurality of spaced slots formed in said carrier member each defining a position of said support block along the length of said carrier member; a locking plate carried by said support block for movement into and out of engagement with said slots; and means for maintaining said locking plate engaged in one of said slots.

17. In combination with a support block slideably supported on a carrier member for reciprocal movement longitudinally of the carrier member, releasable lock means comprising; a plurality of spaced slots formed in said carrier member each defining a position of said support block along the length of said carrier member; a locking plate; guide means formed on said support block for guiding said locking plate during movement thereof into and out of engagement with said slots; and spring tab means carried on said support block and engageable in a groove formed in said locking plate for retaining said locking plate engaged with one of said slots.

18. In combination with a support block slideably supported on a carrier member for reciprocal movement longitudinally of said carrier member, releasable means comprising: a plurality of spaced slots formed in said carrier member and extending transversely of the longitudinal axis thereof, each of said slots defining a position of said support block along the length of said carrier member; a locking plate having an end thereof engageable in said slots; guide means on said support block for guiding said locking plate during reciprocal movement thereof transversely of said carrier member into and out of engagement with said slots; said locking plate having a groove formed in an edge thereof above said end; and a spring tab having one end thereof secured to said support block and extending parallel with said carrier member beyond said locking plate, said spring tab being bendable away from said locking plate out of said groove to permit said locking plate to slide out of engagement with one of said slots and being received within said groove for retaining said locking plate engaged with another one of said slots.

No references cited.

WILLIAM W. DYER, JR, *Primary Examiner.*

W. D. BRAY, *Assistant Examiner.*